(12) United States Patent
Peng (10) Patent No.: US 11,045,758 B2
(45) Date of Patent: Jun. 29, 2021

(54) PROCESS AND APPARATUS OF OCEAN CARBON CAPTURE AND STORAGE

(71) Applicant: Zero Carbon Energy Innovation Union Inc., City of Industry, CA (US)

(72) Inventor: Sigan Peng, Wuhan (CN)

(73) Assignee: Zero Carbon Energy Innovation Union Inc, City of Industry, CA (US)

( * ) Notice: Subject to any disclaimer, the term of this patent is extended or adjusted under 35 U.S.C. 154(b) by 0 days.

(21) Appl. No.: 15/568,596

(22) PCT Filed: Jun. 8, 2017

(86) PCT No.: PCT/CN2017/087530
§ 371 (c)(1),
(2) Date: Oct. 23, 2017

(87) PCT Pub. No.: WO2017/211312
PCT Pub. Date: Dec. 14, 2017

(65) Prior Publication Data
US 2018/0161719 A1  Jun. 14, 2018

(30) Foreign Application Priority Data

Jun. 11, 2016 (CN) .......................... 201610408323.3
Mar. 9, 2017 (CN) .......................... 201710137942.8

(51) Int. Cl.
*B01D 53/14* (2006.01)
*B01D 53/18* (2006.01)
(Continued)

(52) U.S. Cl.
CPC ..... *B01D 53/1475* (2013.01); *B01D 53/1412* (2013.01); *B01D 53/18* (2013.01);
(Continued)

(58) Field of Classification Search
CPC .... B01D 2252/1035; B01D 2259/4566; B01D 2257/302; B01D 2258/012;
(Continued)

(56) References Cited

U.S. PATENT DOCUMENTS

| 4,235,607 A | 11/1980 | Kinder et al. |
| 5,293,751 A | 3/1994 | Asai |

(Continued)

FOREIGN PATENT DOCUMENTS

| CN | 1262145 | 8/2000 |
| CN | 101732961 | 6/2010 |

(Continued)

OTHER PUBLICATIONS

Wang Jianghai, et al., "Marine Carbon Sequestration: Current Situation, Problems and Future." Advances in Earth Science, 2015, 30 (1); 17-25, doi; 10.11867/j. issn. 1001-8166.2015.01.0017.

(Continued)

*Primary Examiner* — Anthony J Zimmer
*Assistant Examiner* — Syed T Iqbal
(74) *Attorney, Agent, or Firm* — Hauptman Ham, LLP (57) ABSTRACT

The present invention relates to a process and an apparatus of ocean carbon capture and storage (Ocean CCS), which can be used for carrying out carbon capture and storage of flue gas discharged from marine facilities using fossil energy such as coastal power plants and marine ships, and direct air capture (DAC). The natural engineering method are adopted in the present invention, and natural seawater is used for washing and dissolving $CO_2$ gas for carbon capture; and natural seawater carbonate neutralization and formed bicarbonate is used for ocean storage in water column; and low head and large water flow is used to save energy. The discharged water complies with environmental regulations. The present invention provides an affordable and green (Continued)

effective mean for using marine ecosystems of carbon sinks and reservoirs to respond to the climate change.

11 Claims, 7 Drawing Sheets (51) Int. Cl.
*B01D 53/62* (2006.01)
*C01B 3/02* (2006.01)
(52) U.S. Cl.
CPC ...... *B01D 53/62* (2013.01); *B01D 2252/1035* (2013.01); *B01D 2257/504* (2013.01); *B01D 2258/0283* (2013.01); *B01D 2259/4566* (2013.01); *Y02A 50/20* (2018.01); *Y02C 20/40* (2020.08)
(58) Field of Classification Search
CPC .. B01D 53/1481; B01D 53/507; B01D 53/78; B01D 53/92; B01D 53/18; B01D 2255/20738; B01D 2258/01; B01D 2259/814; B01D 53/1425; B01D 53/1493; B01D 53/504; B01D 53/60; B01D 53/77; B01D 2257/504; B01D 2258/0283; B01D 53/1412; B01D 53/1475; B01D 53/62; Y02A 50/2342; Y02T 10/20; C02F 2103/08; E21B 43/01
See application file for complete search history.

(56) References Cited

U.S. PATENT DOCUMENTS

| | | | | |
|---|---|---|---|---|
| 6,254,667 | B1* | 7/2001 | Saito | B01D 53/1475 261/77 |
| 6,406,219 | B1* | 6/2002 | Nove | B01D 53/1475 405/129.25 |
| 6,881,389 | B2* | 4/2005 | Paulsen | B01D 53/1462 423/210 |
| 8,551,221 | B2 | 10/2013 | Wolfe | |
| 2008/0025852 | A1* | 1/2008 | Davis | F03B 13/1865 417/331 |
| 2011/0100218 | A1 | 5/2011 | Wolfe | |
| 2012/0192564 | A1* | 8/2012 | Mishima | B01D 53/1425 60/676 |

FOREIGN PATENT DOCUMENTS

| | | |
|---|---|---|
| CN | 101852332 | 10/2010 |
| CN | 102112207 | 6/2013 |
| CN | 105498492 | 4/2016 |
| CN | 105587294 | 5/2016 |
| CN | 105819445 | 8/2016 |
| CN | 106076066 | 11/2016 |
| CN | 106731510 | 5/2017 |
| EP | 0408979 | 1/1991 |
| EP | 0982065 | 3/2000 |
| EP | 1116517 | 7/2011 |
| JP | 4-104834 | 4/1992 |
| WO | WO2013144178 | 10/2013 |

OTHER PUBLICATIONS

Urs Newzealand: "Capture of CO2 Using Water Scrubbing", Report PH3/26; Jul. 31, 2000 (Jul. 31, 2000); pp. 1-81.

Jesper Kjolholt et al: "Assessment of Possible Impacts of Scrubber Water Discharges on the Marine Environment", Danish Ministry of the Environment, Environmental Protection Agency; Environmental Project No. 1431. 2012; Jan. 1, 2012; pp. 1-93.

Upeksha Caldera et al: "Local cost of seawater RO desalination based on solar PV and wind energy: A global estimate", Desalination, Desalination 385; vol. 385, May 1, 2016; pp. 207-216.

Greg H. Rau: "CO2 Mitigation via Capture and Chemical Conversion in Seawater", Environmental Science & Technology, vol. 45, No. 3, Feb. 1, 2011; pp. 1-5.

\* cited by examiner

PROCESS AND APPARATUS OF OCEAN CARBON CAPTURE AND STORAGE

RELATED APPLICATIONS

The present application is a National Phase of International Application Number PCT/CN2017/087530, filed Jun. 8, 2017, and claims the priority of China Application No. 201710137942.8, filed Mar. 9, 2017 and China Application No. 201610408323.3, filed Jun. 11, 2016.

FIELD OF THE INVENTION

The present invention relates to a process and an apparatus of ocean carbon capture and storage (Ocean CCS), applicable to carbon dioxide capture and storage for coastal power plants, marine ships and other marine facilities burning fossil fuels and/or direct air capture (DAC). The present invention belongs to a technical field of clean energy and earth engineering.

DESCRIPTION OF RELATED ART

Capture and storage of the carbon dioxide, namely CCS, is a necessary technical solution to reduce greenhouse gases in the atmosphere. However, all of the existing CCS arts are costly geological storage policies, which are far from the actual application from the economical and affordable aspects. Large-scale emission reduction is hard to be achieved.

According to the earth science theory, the absorption of the extra carbon dioxide in the atmosphere depends on the water column of deep ocean finally. For this reason, big studies by international institutions further show that the oceans are already naturally absorbing $CO_2$ from the atmosphere at a rate of about 6 Gt/y and the $CO_2$ flows to the deep ocean naturally. International studies also show that carbon dioxide is a naturally occurring product and its overall impact on the ocean environment should be very small, because of the large size of the ocean carbon reservoir (many times larger than the terrestrial reservoir) (IEA OCEAN STORAGE OF $CO_2$). The conclusion of these studies is that ocean carbon storage is the most cost-effective and prospective policy to respond to the climate change, which is also the safest and the most effective. For this reason, tests of ocean carbon storage were further carried out in 2001. They are going to inject liquid carbon dioxide into two ocean areas in Hawaii and Norway. However, the tests were banned finally though all preparations for funds and materials (including 60 t of liquid carbon dioxide) were made, because environmental protection agency pointed out that injection of $CO_2$ in form of liquid, dense gas or solid into the ocean will lead to immediate death of marine, which seriously destroy the ecological environment of the injected area. Therefore, the test belongs to "marine dumping" behaviors prohibited by the London Convention and OSPAR Convention. Since then, the international experimental research on ocean carbon storage has stagnated for over a decade. Therefore, tests of ocean storage cannot be carried out in the ocean if the storage mode of high-concentration carbon dioxide of the geological storage is used continuously. So, the benefit of "the most cost-effective policy" cannot be demonstrated and applied, and ocean carbon storage cannot become a practical policy for carbon reduction. Finally, the long-time desire for responding to the climate change effectively using ocean resources cannot be achieved.

SUMMARY OF THE INVENTION

The purpose of the process and apparatus of ocean carbon capture and storage of the invention is to overcome the defect of the prior art of ocean carbon storage, and to provide the most cost-effective policy of ocean carbon storage which also comply with environmental regulations, so that the ocean carbon storage can be practical solution to respond to the climate change. Meanwhile, the solution is affordable from the economic and environmental aspects.

The present invention firstly provides a process of ocean carbon capture and storage, comprising steps of:
1) carbon capture including scrubbing gas containing carbon dioxide with pumped seawater to produce after-scrubbing seawater as a product of carbon capture in which the carbon dioxide of the gas is absorbed; and
2) carbon storage including discharging the product of carbon capture into the water column of ocean to realize ocean storage.

In a preferred embodiment, in step 2), the product of carbon capture is discharged into the water column of ocean under atmospheric pressure through a pipe.

In a preferred embodiment, the process further comprises adjusting a ratio of volume of the seawater to volume of carbon dioxide in the product of carbon capture to adjust pH value of the product of carbon capture discharged into the ocean.

In a preferred embodiment, the gas containing carbon dioxide in step 1) is atmosphere, and the seawater for scrubbing is pumped with power provided by wind, and/or wave of ocean current, and/or sunlight.

In a preferred embodiment, the gas containing carbon dioxide is flue gas discharged from burning of fossil fuel.

In a preferred embodiment, the process further comprises the steps that at least 10%, or 20%, or 50%, or 70%, or 80%, or 90% of the carbon dioxide in the flue gas is absorbed into the seawater and then is discharged into the water column of ocean, and a volume of the seawater is configured to be enough to absorb at least 10%, or 20%, or 50%, or 70%, or 80%, or 90% of the carbon dioxide of the flue gas.

In a preferred embodiment, the process further comprises the step that the seawater is pumped to a head of no more than 50 m, or 40 m, or 30 m, or 20 m, or 19 m, or 15 m, or 12 m, or 10 m, or 9 m, or 8 m, or 6 m, or 5 m, or 4 m, or 2 m, or 1 m to scrub the flue gas containing carbon dioxide, wherein the head of 0 m is a level of ocean where the scrubbing seawater is pumped.

In a preferred embodiment, the process further comprises providing packings and performing the scrubbing in the packings and configuring a head of the pumped scrubbing seawater so that an energy consumption of the carbon capture is no more than 1000 MJ/t, or 500 MJ/t, or 400 MJ/t, or 350 MJ/t, or 300 MJ/t, or 250 MJ/t, or 200 MJ/t, or 150 MJ/t, or 100 MJ/t, or 60 MJ/t, or 50 MJ/t, or 40 MJ/t, or 30 MJ/t, or 20 MJ/t, or 10 MJ/t, or 5 MJ/t.

In a preferred embodiment, a whole process from the carbon capture to the carbon storage is a consecutive reaction.

In a preferred embodiment, the process further comprises discharging the product of carbon capture into the surface layer, and/or the middle layer, and/or the deep layer of the water column of ocean.

In a preferred embodiment, the process further comprises discharging the after-scrubbing seawater into an ocean current in the water column of ocean that does not pass the location where the scrubbing seawater is pumped.

In a preferred embodiment, the packing scrubbing is realized through large area contact between the scrubbing seawater and the flue gas.

The present invention secondly provides a process of ocean carbon capture and storage, wherein the process comprises the steps of:

a. continuously leading flue gas containing carbon dioxide which is discharged from a burner for burning fossil fuel into a carbon capture device;

b. continuously leading seawater into the carbon capture device;

c. providing packings in the carbon capture device to enlarge contact area of the flue gas of step a and the seawater of step b to scrub the flue gas and absorb the carbon dioxide of the flue gas;

d. continuously discharging scrubbed flue gas into atmosphere, wherein in the scrubbed flue gas, the volume of carbon dioxide has reduced;

e. continuously discharging the seawater containing carbon dioxide generated in step c from the carbon capture device; and f. continuously discharging the seawater containing carbon dioxide generated in step e into a carbon storage location in an ocean to realize the carbon storage;

wherein the fossil fuel is selected from a group consisting of coal, oil and gas; and the burner is selected from a group consisting of a boiler of a steam turbine, an internal combustion engine and a gas turbine which are used in a coastal power plant or a marine ship; and the flue gas is generated from burning of the fossil fuel; and the seawater of step b is the seawater pumped from the ocean to be used for scrubbing directly, and/or is the seawater pumped from the ocean to cool the burner firstly before being used for scrubbing.

In a preferred embodiment, at least 10%, or 20%, or 50%, or 70%, or 80%, or 90% of carbon dioxide in flue gas in step a is removed compared with the scrubbed flue gas in step d.

In a preferred embodiment, at least 20% of carbon dioxide in flue gas in step a is removed compared with the scrubbed flue gas in step d.

In a preferred embodiment, the difference between the increased temperature of the seawater containing carbon dioxide discharged continuously in step e and the temperature of the seawater led into the carbon capture device in step b, is less than 50° C.

In a preferred embodiment, the difference between the increased temperature of the seawater containing carbon dioxide discharged continuously in step e and the temperature of the seawater led into the carbon capture device in step b, is less than 20° C.

In a preferred embodiment, the difference between the increased temperature of the seawater containing carbon dioxide discharged continuously in step e and the temperature of the seawater led into the carbon capture device in step b, is less than 2° C.

In a preferred embodiment, the difference between the decreased pH value of the seawater containing carbon dioxide discharged continuously in step e and the pH value of the seawater at carbon storage location is no more than 2 pH unit.

The present invention thirdly provides an apparatus of ocean carbon capture and storage, comprising:
  a burner for producing the flue gas from the burning of fossil fuel;
  a carbon capture device, which is connected to the burner to scrub the flue gas to capture carbon dioxide;
  a seawater pumping equipment for leading seawater into the carbon capture device;
  a chimney for leading cleaned flue gas out of the carbon capture device; and
  a seawater discharging pipe;
wherein the carbon capture device comprises a water distributor and a packing layer; and a seawater outlet of the carbon capture device is connected to the seawater discharging pipe; and a outlet of the discharging pipe is located in the water column of ocean.

In a preferred embodiment, an altitude of the water distributor of the carbon capture device is configured to be no more than 50 m, or 40 m, or 30 m, or 20 m, or 19 m, or 15 m, or 12 m, or 10 m, or 9 m, or 8 m, or 6 m, or 5 m, or 4 m, or 2 m, or 1 m, wherein the altitude of the water distributor is defined by a distance between a horizontal centre of the water distributor and level of ocean where the scrubbing seawater is pumped into the seawater pumping equipment.

In a preferred embodiment, the seawater pumping equipment of the carbon capture device is a seawater cooling system for the burner and/or a seawater intake pump.

In a preferred embodiment, the apparatus further comprises a seawater adjusting pump which is connected to a water regulator to adjust pH value of the scrubbing seawater discharged into the ocean.

In a preferred embodiment, the packing layer of the carbon capture device is composed of industrial bulk packings, and/or regular packings, and/or perforated plate packings, and/or grilles.

In a preferred embodiment, a dry packing factor of the packing is 5~2000/m, wherein the definition of the dry packing factor is according to the manual of conventional packing industrial products.

In a preferred embodiment, the seawater discharging pipe is a membrane pipe.

In a preferred embodiment, the carbon capture device is located on an ocean platform which has an adjustable altitude according to level of tide.

The present invention fourthly provides an apparatus of ocean carbon capture and storage for carrying out the process of the present invention, comprising:
  a carbon capture device;
  a seawater pumping equipment for leading seawater into the carbon capture device; and
  a power equipment for providing power for the seawater pumping equipment;
  a water distributor which is over the carbon capture device;
  a water collector which is under the carbon capture device; and
  a seawater discharging pipe which is connected to the water collector.

In a preferred embodiment, the power equipment comprises a wind power device, and/or a conversion device of wave of ocean current, and/or a solar power device.

In a preferred embodiment, the power equipment comprises:
  a wind driven device;
  a power transmission device which is connected to the seawater pumping equipment to transmit the power provided by the wind driven device to the seawater pumping equipment;
  wherein the power transmission device comprises a mechanical transmission device and/or a electromechanical transmission device composed of a wind driven generator and an electromotor.

In a preferred embodiment, the energy equipment comprises:
- a water driven device;
- a power transmission device which is connected to the seawater pumping equipment to transmit the power provided by the water driven device to the seawater pumping equipment;

wherein the power transmission device comprises a mechanical transferring device and/or a electromechanical transmission device composed of a water driven generator and electromotor.

In a preferred embodiment, the above two apparatus for carrying out the process of the present invention is fixed on a seabed and/or ocean platform.

The following description is to set forth the technical principle and effect of the present invention.

The principle used in the present invention is that carbon dioxide is a natural substance soluble in seawater and abundant in seawater, and the storage of carbon dioxide in ocean can be massive and long-term and environment-friendly. In the present invention, flue gas discharged from fossil fuel is scrubbed by seawater, or the atmosphere (i.e. the air in its natural state) is collected and scrubbed directly to achieve the purpose of carbon capture through the dissolution of carbon dioxide in the flue gas and/or atmosphere, and then the seawater in which carbon dioxide in the flue gas and/or atmosphere is dissolved is discharged to the surface layer, and/or middle layer, and/or deep layer of the water column in the ocean to achieve the purpose of carbon storage under the conditions that the related indicators such as pH value comply with environmental regulations. Moreover, the diffusion of the ocean current can further reduce the harmful impact on the marine environment, and further enhance the effect of ocean storage. The seawater in which carbon dioxide is dissolved can be discharged to the surface layer, or middle layer, or deep layer of the water column in the sea or ocean. Some other studies indicate that the $CO_2$ can be stored for 1000 years if it is discharged to a depth of 1000 m in the ocean.

$CO_2$ is dissolved in seawater according to the response of following equation (from left to right):

$$CO_2 + H_2O \Leftrightarrow H_2CO_3 \text{(carbonic acid)}$$

$$H_2CO_3 \Leftrightarrow H^+ + HCO_3^- \text{(bicarbonate ion)}$$

$$HCO_3^- \Leftrightarrow H^+ + CO_3^{2-} \text{(carbonate ion)}$$

The bicarbonate ion is the main form of carbon dioxide in seawater. The carbonic acid, bicarbonate ion and carbonate ion are collectively referred to as dissolved inorganic carbon (DIC).

Usually the solubility of carbon dioxide in water is very low, so the seawater scrubbing produces a low concentration of $CO_2$, namely the after-scrubbing seawater which contains a low concentration of DIC. The wording of "low concentration" should be read as compared with the prior art. In the prior art, the product of carbon capture is in form of a pure liquid carbon dioxide, dense gas or solid, in which the concentration of carbon dioxide is several orders of magnitude higher than that in the present invention. A person skilled in the art may consider that the energy consumption is very huge in the present invention because massive scrubbing seawater is needed due to the "low concentration". However, in the present invention, the total energy consumption can be reduced by reducing the pumping head of the seawater, so that the cost of carbon capture and storage is at least an order of magnitude lower than that of the prior CCS art. In coastal thermal power plant, the cost can be further reduced if cooling water is reused.

At the same time, the present invention has the effect of flue gas desulfurization because sulfur dioxide is also a kind of natural substance soluble and abundant in seawater, and sulfur dioxide in the flue gas is less than that of carbon dioxide, and sulfur dioxide is more soluble in water than carbon dioxide. Therefore, the present invention has also an effect of flue gas desulfurization.

Obviously, the application of the present invention can up-scale the commercial application of carbon capture and storage in the coastal areas where large carbon emission sources are located densely. In such condition, scale effect is prominent.

Double effects can be achieved if the present invention is applied in ocean shipping. The first one is that the carbon sink resources of the surface layer of ocean can be used so that the escaped carbon emissions which cannot be captured previously can be captured and kept in storage currently, which reduces the carbon emissions from ships at extremely low cost. The second one is to avoid using low sulphur fuel, indirectly reducing carbon emissions of oil refining industry. Therefore, the dual pressure under the international carbon reduction, sulfur reduction act can be released in shipping industry. Economic and green advantages can be maintained continuously.

There are especially important benefits if carbon capture and storage of the present invention is used for the air in its natural condition. The first reason is that the atmospheric circulation can be used for capturing all kinds of carbon emissions without transport cost, including the escaped carbon emissions which cannot be captured by other methods. The second one is that carbon capture and storage with zero energy consumption can be realized by using wind, ocean current, sunshine and other renewable energy. The third reason is that there is no limit on ocean area and peripheral supports are not needed so that a large number of apparatuses can be fixed in all kinds of ocean area.

Obviously, the present invention based on the earth science principle, has achieved good technical effects by adopting the method of natural engineering. The present invention provides an affordable and practical and effective technical policy for achieving the long-time desire of using ocean resources to respond to the climate change.

Names of components or structures corresponding to the reference numbers in the drawings are provided as follows. 1—burner; 2—carbon capture device; 2.1—water distributor; 2.2—altitude of water distributor; 2.3 water collector; 3—seawater pumping equipment; 3.1—seawater increase pump; 3.2—level of ocean; 4—seawater adjusting pump; 5—seawater outlet; 6—chimney; 7—seawater discharging pipe; 8—water regulator; 9—sea chest; 10—main seawater duct of ship; 11—cabin, 12—coast; 13—ocean current; 14—power equipment; 14.1—wind driven device; 14.2—water driven device; 14.3—power transmission device; 15—wind.

DETAILED DESCRIPTION OF THE PREFERRED EMBODIMENTS

The present invention provides a process of ocean carbon capture and storage, comprising steps of:
1) carbon capture including scrubbing gas containing carbon dioxide with pumped seawater to produce after-scrubbing seawater as a product of carbon capture in which the carbon dioxide of the gas is absorbed; and
2) carbon storage including discharging the product of carbon capture into the water column of ocean.

The term of "seawater" here should be read as natural seawater derived from the sea or ocean, including the natural seawater for cooling industrial facilities. The purpose of the present invention can be achieved by using the seawater without adding any other substance (e.g., adding alkali). Of course, in some applications, other additives can also be added to achieve special purposes, such as, in order to absorb some special components in the flue gas.

The term of "scrubbing" here should be read as the step of contact of seawater with the gas for the purpose of carbon dioxide capture. Contact can be performed in an apparatus including but not limited to: spray injector, bubbler, Venturi tower, sprayer, filter, rotary sprayer, grille, trays tower or packing tower.

The wording of "carbon capture" here should be read as the step of capturing $CO_2$ in the gas containing carbon dioxide in the course of scrubbing. In the course of scrubbing, some of the $CO_2$ is dissolved into the seawater to be a dissolved inorganic carbon (DIC) in the after-scrubbing seawater.

The wording of "carbon storage" here should be read as the step of discharging the after-scrubbing seawater containing CO2 of the flue gas into the water column of ocean directly under atmospheric pressure through pipes. In the course of carbon storage, concentrated CO2 is not needed before discharged. If needed, further dilution of CO2 can be performed by adding additional seawater to adjust the pH value of discharged seawater to comply with environmental regulations. Different requirements on the pH value of discharged seawater may be needed in different regions of the ocean, including different depths of the ocean.

The wording of "water column of ocean" here should be read as the seawater in the surface layer (tens of meters of depth), the middle layer (less than hundreds of meters of depth) or deep layer (more than hundreds of meters of depth). International Studies by IPCC and IEA show that the physical and chemical systems of water column of ocean, as well as the marine ecosystem, can absorb and store carbon dioxide friendly.

The flowing seawater, i.e. the ocean current can enhance the effect of ocean carbon storage. If the product of carbon capture is discharged into the ocean current of the water column of ocean that does not pass the inlet through which the scrubbing seawater is pumped, it can prevent the discharged seawater from flowing back to the inlet.

These are common knowledge that $CO_2$ is soluble in water and the seawater can absorb more $CO_2$. But so far, there is no report on any technical policy that seawater is used for carbon capture and storage. The reason is that the people skilled in the art are accustomed to considering that the only way to reduce cost to be affordable is purifying the captured $CO_2$ into high concentration in a form of liquid, dense gaseous or solid to reduce material volume to reduce the cost of transportation and storage. Because the cost of the high-concentration solution is far from an affordable and practical technology, it is not possible of a person skilled in the art to think of any low-concentration policy.

The inventor of the present invention has been engaged in research on desulfurization by seawater scrubbing for a long time. The inventor accidentally found that the low-concentration solution of seawater scrubbing brings the effects of not only desulfurization, but also carbon capture and storage. Moreover, the inventor also found a method to greatly reduce costs, so that the cost is reduced to be affordable and practical.

What the invention of the present invention found firstly is that, in the prior technology of desulfurization of seawater scrubbing (FGD, EGC), less than 10% of the carbon dioxide in flue gas are usually dissolved into the scrubbing water, and they were driven into the atmosphere in the process of drainage and aeration treatment. Therefore, the inventor of the present invention carried out a test on FGD in a coastal power plant and a test on EGC in an ocean tanker for many years. The tests indicated it is possible that carbon dioxide dissolved in the seawater is not driven out or a small amount of carbon dioxide dissolved in the seawater is driven out under the condition that the discharged seawater complies with the environmental regulations, if the technology of desulfurization of seawater scrubbing is modified properly.

The inventor of the present invention also found in a further test that increasing the volume of scrubbing seawater can result in that more than 10% of the carbon dioxide in the flue gas is captured and kept in storage. The inventor also found that the energy consumption and the cost, which increase in the course of increasing the volume of scrubbing seawater, can be reduced through a method of reducing the head of scrubbing seawater which is pumped. In this case, the cost for capture and storage of at least 20% of the carbon dioxide in the flue gas is usually affordable in a variety of applications, such as power plants and ships. The following part of the present application provides a detailed description of several examples that the cost for removing more carbon dioxide is affordable in several typical applications. In these examples, the purpose that no less than 30%, or 40%, or 50%, or 60%, or 70%, or 80%, or 90% of carbon dioxide in the flue gas is captured and kept in storage is finally achieved. In an example of coastal power plant, even 99% of $CO_2$ in the flue gas is captured and kept in storage, and the increased cost is affordable.

Because a certain amount of water can dissolve limited amount of $CO_2$ (generally 1 $m^3$ of freshwater can absorb about 0.8 $m^3$ of $CO_2$ under room temperature and atmospheric pressure, and the seawater can absorb a little more $CO_2$ than freshwater), a large amount of scrubbing seawater is needed if a large number of $CO_2$ from flue gas is needed to be captured. For example, in an example of power plant, if all of the original cooling seawater is used to scrub flue gas, only about 30% of $CO_2$ can be captured. If more than 90% of $CO_2$ is needed to be captured, it is needed to add additional scrubbing seawater in amount that is about twice original cooling seawater. Generally speaking, it is a very huge amount. For the purpose of affordable cost, it is needed to adopt two technical strategies. The one is to reduce the energy consumption of pumping seawater, and the other is to increase the absorption efficiency of seawater to $CO_2$ to minimize the amount of scrubbing seawater which is needed. Firstly, the head of pumping seawater, i.e. the altitude of carbon capture device, should be reduced to decrease the energy consumption of pumping seawater. In an example of a large power plant, the carbon capture device, to which the scrubbing seawater is pumped, at an altitude of 50 m can meet the requirements. Of course, in other examples, 40 m, or 30 m can also meet the requirements. For some typical applications, such as power plants and marine ships, the following examples of the present application provide the detailed description. In these examples, carbon capture device, to which the scrubbing seawater is pumped, is configured at an altitude of no more than 20 m, or 19 m, or 15 m, or 12 m, or 10 m, or 9 m, or 8 m, or 6 m, or 5 m, or 4 m, or 2 m, or 1 m. In another example, because the mean of tidal level in local area at different time vary greatly, the carbon capture device is set on a platform or a floating dock and the platform or floating dock has an adjustable altitude according to level of tide. In such case, the energy consumption of delivering seawater is reduced to the lowest level according to the principle that boats go up with the level of the water.

On the other hand, the inventor also found in test that, among all kinds of scrubbing apparatus, packing scrubber or absorption tower as the carbon capture device, is the best one for reducing amount of scrubbing seawater and reducing the head of pumping seawater. As a result, the energy consumption of pumping seawater is the lowest, and the operating is the most stable. Based on the long-termed experience of being engaged in desulfurization of seawater scrubbing and the test for absorption of carbon dioxide, the inventor of the present invention also found that the preferred dry packing factor of the packings is 5~2000/m (the definition of dry packing factor can be found in manual of conventional packing industrial products). Such packings provide the best effect of carbon capture through seawater scrubbing. For example, packings of 5/m of dry packing factor can meet the requirements. In the following examples, the packing of 10/m, or 15/m, or 35/m, or 55/m, or 65/m, or 95/m, or 150/m, or 250/m, or 350/m, or 450/m, or 650/m, or 850/m, or 1000/m, or 1200/m, or 1500/m, or 1800/m, or 2000/m of dry packing factor can also meet the requirements. The packing scrubbing refers to the scrubbings which is performed by the large area contact between the scrubbing seawater and the discharged flue gas in the packings.

According to the above description, the inventor of the present invention found that the energy consumption of carbon capture is reduced finally and the total cost of CCS technology is reduced to a practical level through the strategies including packing scrubbing and reducing the head of pumping seawater. For example, in an example, the energy consumption of carbon dioxide capture is no more than 1000 MJ/t (million joule/ton), which is practical. For the applications of the power plant and marine ships, the following examples show that the energy consumption of carbon capture is no more than 500 MJ/t, or 400 MJ/t, or 350 MJ/t, or 300 MJ/t, or 250 MJ/t, or 200 MJ/t, or 150 MJ/t, or 100 MJ/t, or 60 MJ/t, or 50 MJ/t, or 40 MJ/t, or 30 MJ/t, or 20 MJ/t, or 10 MJ/t, or 5 MJ/t, which is also practical.

The inventor of the present invention further found that the carbon capture and storage can be used for the air in its natural state (DAC) on the sea according to the present invention, which has a good effect of reducing carbon content in the atmosphere. In the following examples, what are only used are the mechanical energy and/or electrical energy coming from the wind on the sea, and/or ocean current waves, and/or sunlight and other natural energy, which are all renewable energy. It means that the energy consumption is zero. Therefore, the running cost is very low and only construction and depreciation costs are required and electric power generation and transport and peripheral supports are not needed. Moreover, the construction cost is also very low. On the other hand, the purpose of building a lot of wind driven and wave driven generation facilities is to replace the offshore fossil energy to reduce the atmosphere carbon emissions finally. However, the carbon dioxide in the atmosphere can be captured and kept in storage directly according to the present invention. In this case, the efficiency of reducing carbon is higher.

Further detailed description of the present invention is provided in the following examples according to the drawings.

Example 1

Figure 1:
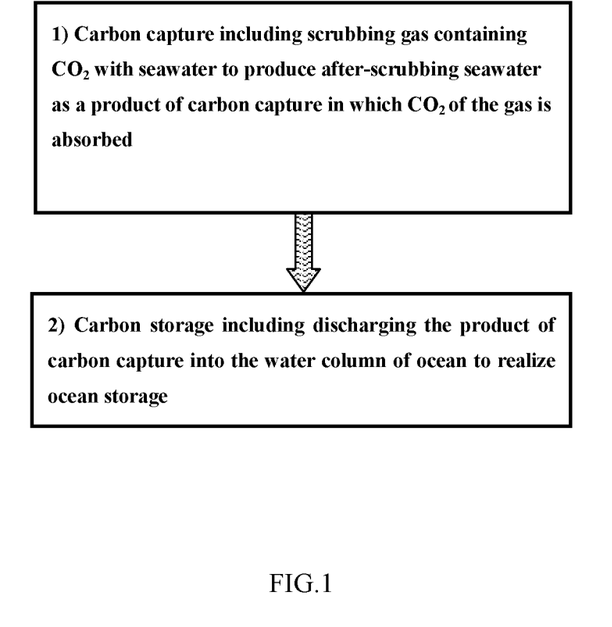
FIG. 1 is a schematic diagram showing an example of the implementation steps of the process of seawater carbon capture and storage of the present invention.

This is a basic example of the process of ocean carbon capture and storage of the present invention. As shown in FIG. 1, the process includes the steps of: 1) carbon capture including scrubbing gas containing carbon dioxide with pumped seawater to produce after-scrubbing seawater as a product of carbon capture in which the carbon dioxide in the gas is absorbed; and 2) carbon storage including discharging the product of carbon capture into the water column of ocean to realize ocean storage.

In a varied example based on this example, in step 2), the product of carbon capture is discharged into the water column of ocean under atmospheric pressure through a pipe. The whole course from the carbon capture to the carbon storage is a consecutive reaction.

In another varied example based on this example, the process further comprises adjusting a ratio of volume of the seawater to volume of carbon dioxide in the product of carbon capture to adjust pH value of the product of carbon capture discharged into the ocean.

In another varied example based on this example, the process further comprises discharging the product of carbon capture into an ocean current in the water column of ocean that does not pass the location where the scrubbing seawater is pumped.

In following varied examples based on this example, the process further comprises discharging the product of carbon capture into the surface layer, and/or the middle layer, and/or the deep layer of the water column of ocean.

Example 2

Figure 2:
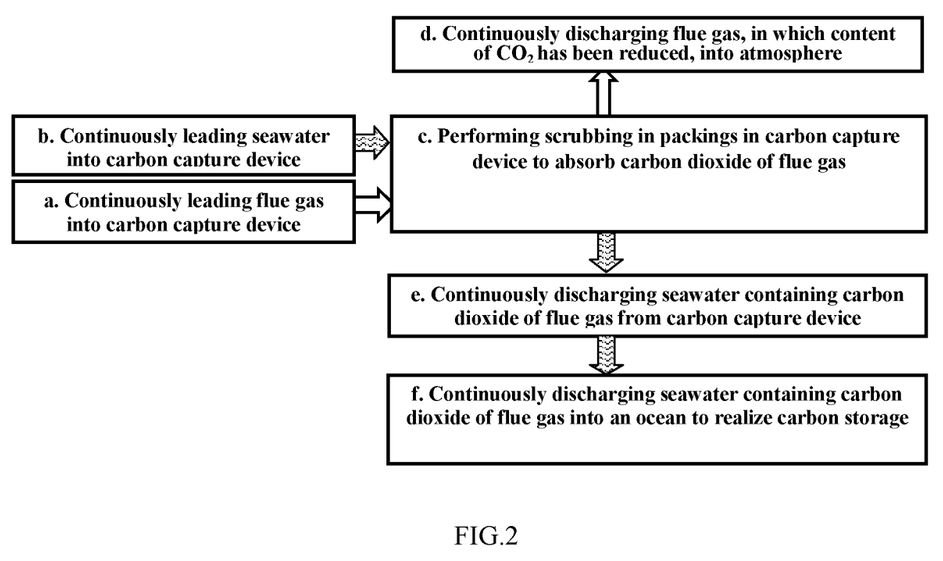
FIG. 2 is a schematic diagram showing another example of the implementation steps of the process of seawater carbon capture and storage of the present invention.

This is another basic example of the process of ocean carbon capture and storage of the present invention. As shown in FIG. 2, the gas containing carbon dioxide is the flue gas discharged from the burning of fossil fuel and the process includes the steps of: a. continuously leading flue gas containing carbon dioxide which is discharged from a burner for burning fossil fuel into a carbon capture device; b. continuously leading seawater into the carbon capture device; c. providing packings in the carbon capture device to enlarge contact area of the flue gas of step a and the seawater of step b to enhance absorbance of the carbon dioxide by the seawater; d. continuously discharging scrubbed flue gas into atmosphere; e. continuously discharging the seawater containing carbon dioxide generated in step c from the carbon capture device; and f. continuously discharging the seawater containing carbon dioxide generated in step e into a carbon capture location in the water column of ocean to realize the carbon storage; wherein the fossil fuel is selected from a group consisting of coal, oil and gas; and the burner is selected from a group consisting of a boiler of a steam turbine, an internal combustion engine and a gas turbine which are used in a coastal power plant or a marine ship; and the flue gas is generated from burning of the fossil fuel; and the seawater of step b is the seawater pumped from an ocean to be used for scrubbing directly, and/or is the seawater pumped from an ocean to cool the burner firstly before being used for scrubbing.

Example 3

This is an example based on above Example 2. As shown in FIG. 2, at least 10% of carbon dioxide in the flue gas in step a is removed compared with the scrubbed flue gas in step d.

In a varied example based on this example, at least 20% of carbon dioxide in the flue gas in step a is removed compared with the scrubbed flue gas in step d.

In more varied examples based on this example, at least 30%, or 40%, or 50%, 60%, or 70%, or 80%, or 90% of carbon dioxide in the flue gas in step a is removed compared with the scrubbed flue gas in step d.

Example 4

This is an example based on Example 2. The difference between the decreased pH value of the seawater containing carbon dioxide discharged continuously in step e and the pH value of the seawater at the discharging location, is on more than 2 pH unit. This pH value is achieved through configuring the volume of flue gas which is led into the carbon capture device, the volume of scrubbing seawater and ratio of gas to liquid. The purpose is to comply with the relevant laws and technical standards for marine drainage.

Example 5

Figure 3:
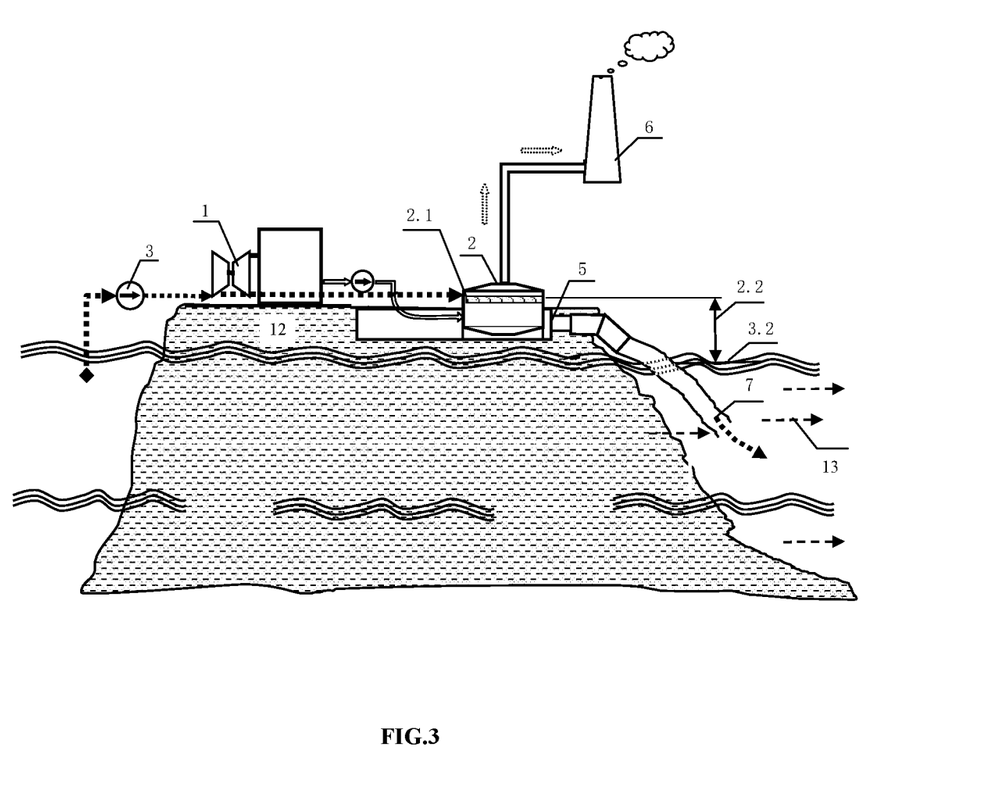
FIG. 3 is a schematic diagram showing an example of the present invention used in a coastal gas-steam combined cycle power plant.

This is a basic example of the apparatus of ocean capture and storage for carrying out the process of the present invention. As shown in FIG. 3, the apparatus includes:
a burner 1 for producing the flue gas from the burning of fossil fuel;
a carbon capture device 2, which is connected to the burner to scrub the flue gas to capture carbon dioxide;
a seawater pumping equipment 3 for leading seawater into the carbon capture device 2;
a chimney 6 for leading cleaned flue gas out of the carbon capture device 2; and
a seawater discharging pipe 7.

Wherein, the carbon capture device 2 comprises a water distributor 2.1. A packing layer is provided in the carbon capture device 2.

A seawater outlet 5 of the carbon capture device 2 is connected to the discharging pipe 7; and an outlet of the discharging pipe 7 is located in the water column of ocean.

Example 6

This is an example based on Example 5. The carbon capture device 2 comprises the water distributor 2.1. The altitude 2.2 of the water distributor is not more than 20 m, and the altitude 2.2 of the water distributor is defined by a distance between a horizontal centre of the water distributor 2.1 and level of ocean 3.2 where the scrubbing seawater is pumped into the seawater pumping equipment 3.

In more varied examples based on this example, the altitude 2.2 of the water distributor is not more than 19 m, 15 m, 12 m, 10 m, 9 m, 8 m, 6 m, 5 m, 4 m, 2 m, 1 m.

The purpose of reducing the altitude 2.2 of the water distributor is to reduce the energy consumption of delivering seawater. This energy consumption is the main energy consumption of the CCS technology in the present invention.

The packing layer is provided in the carbon capture device 2. The packing layer is composed of industrial bulk packings, and the dry packing factor of the packings is 5/m.

In one varied example based on this example, the dry packing factor of the packings is 30/m.

In several other varied example based on this example, the dry packing factor of the packings is 60/m, 120/m, 200/m, 300/m, 400/m, 500/m, 600/m, 700/m, 800/m, 900/m, 1000/m, 1200/m, 1400/m. 1600/m, 1800/m, 2000/m respectively.

In a varied example based on this example, the packing layer is composed of regular packings. In another varied example based on this example, the packing layer is composed of perforated plate packings.

In a varied example based on this example, the packing layer is composed of the combination of various packings.

Example 7

Figure 4:
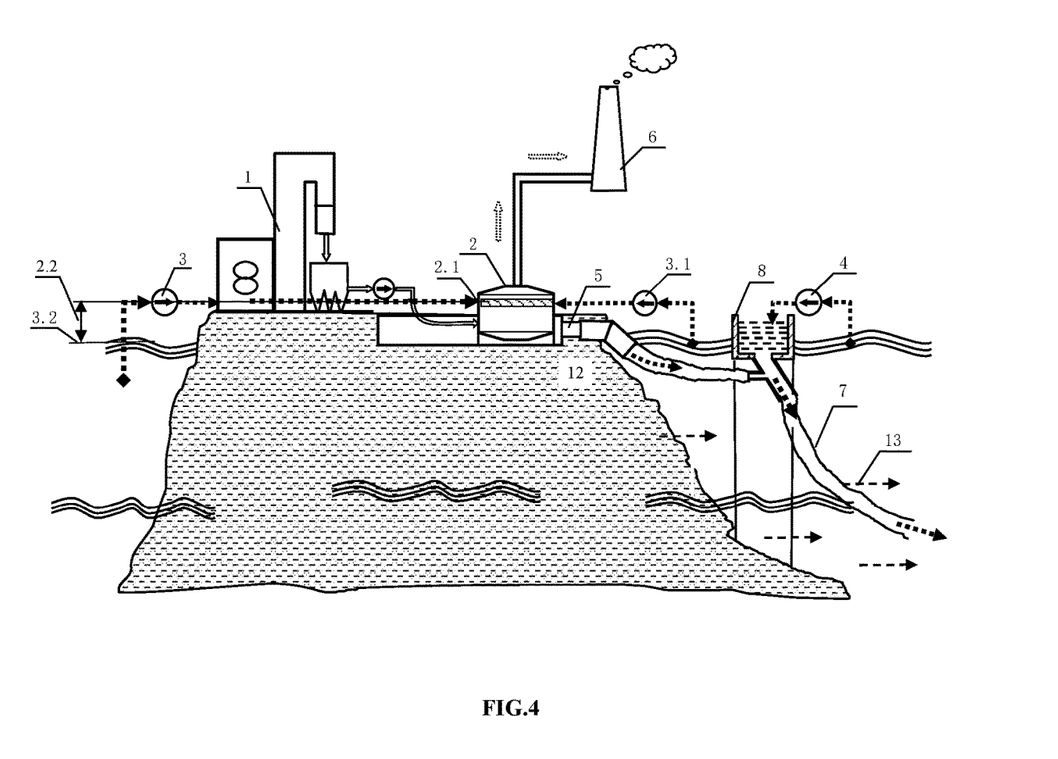
FIG. 4 is a schematic diagram showing another example of the present invention used in a coastal coal-fired power plant.

This is an example based on Example 5. As shown in FIG. 4, Seawater pumping equipment 3 connected to carbon capture device 2 is the seawater cooling system for burner 1.

In a varied example based on this example, seawater pumping equipment 3 is the seawater increase pump 3.1.

In another varied example based on this example, seawater pumping equipment 3 is the seawater cooling system for the burner 1 and the seawater increase pump 3.1. The purpose of such configuration is to provide a greater amount of water to reduce emissions of carbon dioxide.

Example 8

This is an example of coastal gas-steam combined cycle power plant. As shown in FIG. 3, there are three sets of gas-steam combined cycle generating units in the plant. Power of each generating unit is 400 MW, and the total power is 1200 MW. There are two phases of implementation in this example.

In the first phase of implementation, carbon dioxide in flue gas of one generating unit is captured. At least 90% of the carbon dioxide in the flue gas is captured to be dissolved into the scrubbing seawater and is discharged into the water column of ocean. About 1 million tons of carbon dioxide is captured and kept in storage per year.

A project of high concentration carbon capture and storage has been performed in this plant previously. In the project, carbon dioxide in flue gas of one generating unit is captured. About 1 million tons of carbon dioxide is captured and kept in storage per year. The process of the project includes the steps of absorption, desorption, purification, compression and transportation of carbon dioxide. The captured carbon dioxide of high concentration is injected into submarine oil field for Enhanced Oil Recovery (EOR). A special platform is provided in the ocean. The project belongs to the submarine geological storage. After the project is completed, although Enhanced Oil Recovery can bring a certain income and the total cost of the project is lower than that of other non EOR CCS, the total cost is still unaffordable. Therefore, the project was finally terminated.

The carbon capture device of the present example is installed in an empty space prepared for previous CCS project. The area needed by the carbon capture device is only a fifth of the area of previous space. The altitude of water distributor of carbon capture device is about 10 m. Existing seawater cooling system is used directly as seawater leading equipment. The existing inlet and outlet for cooling water in the plant are also used directly, and the depth of the oulet in the water column is more than 150 m. In the coastal plant, for the purpose of cooling efficiency, outlet for cooling water is originally located in the water column of the ocean where the ocean current does not pass the inlet for cooling water. In this case, after the carbon dioxide captured through scrubbing is discharged, the carbon dioxide is diffused and diluted rapidly with the ocean current, which further lessen the original tiny impact on marine environment. The energy consumption of capturing carbon dioxide is not more than 100 MJ/t, and the cost for building and operating the CCS devices is ⅒ of the original cost of project of high concentration.

In the second phase of implementation, more carbon capture devices and seawater pumps are added on the basis of the first phase of implementation, in order to perform the seawater scrubbing carbon capture and ocean water column carbon storage for other two generating units. After the completion of the second phase of implementation, about 3 million tons of carbon dioxide is captured and kept in storage in the plant.

In one varied example based on this example, the carbon capture device is set on a platform that has an adjustable height according to level of tide. In another varied example based on this example, the carbon capture device is set on a floating dock. Thus the energy consumption for pumping seawater can be the lowest regardless of flux and reflux.

Example 9

This is an example of coastal coal power plants. As shown in FIG. 4, the burner is a 600 MW coal-fired generating unit. There are two phases of implementation in this example.

In the first phase of implementation, at least 25% of carbon dioxide in the flue gas of generating unit is captured to be dissolved into the scrubbing seawater. 70,000 t/h of cooling water in the plant is used as the scrubbing seawater directly. About 800 thousand tons of carbon dioxide is captured and kept in storage per year.

In the second phase of implementation, about 95% of carbon dioxide in the flue gas of generating unit is captured to be dissolved into the scrubbing seawater. 210,000 t/h of scrubbing seawater is added. The seawater is delivered through added seawater leading pumps. After the completion of the second phase of implementation, about 3 million tons of carbon dioxide is captured and kept in storage for the generating unit.

Packing tower is used in the carbon capture device to reduce the altitude, and the altitude of the water distributor is about 9 m. Organic braided membrane water pipes are used to discharge the seawater to the middle layer of the water column in the sea, which is about 300 m depth of the water volume, to realize the ocean carbon storage.

In the present example, $CO_2$ emission of the flue gas of the power plant is reduced by 80%. The energy consumption for capturing carbon dioxide is not more than 200 MJ/t.

Example 10

This example is shown in FIG. 4. A seawater adjusting pump 4 is connected to a water regulator to adjust the pH value of the scrubbing seawater discharged into the ocean. This is a better way to control the pH value of discharged seawater and the energy consumption is the lowest.

The after-scrubbing seawater containing carbon dioxide is discharged into a layer between the surface level and the sea bed, which is the 800 m depth of middle layer of the water column in the ocean.

In a varied example based on this example, the after-scrubbing seawater containing carbon dioxide is discharged into 1500 m depth of deep layer of the water column in the ocean. Studies indicated that: carbon dioxide can be kept in storage for more than a thousand years if the carbon dioxide is discharged into more than a thousand meters depth in the ocean.

Example 11

Figure 5:
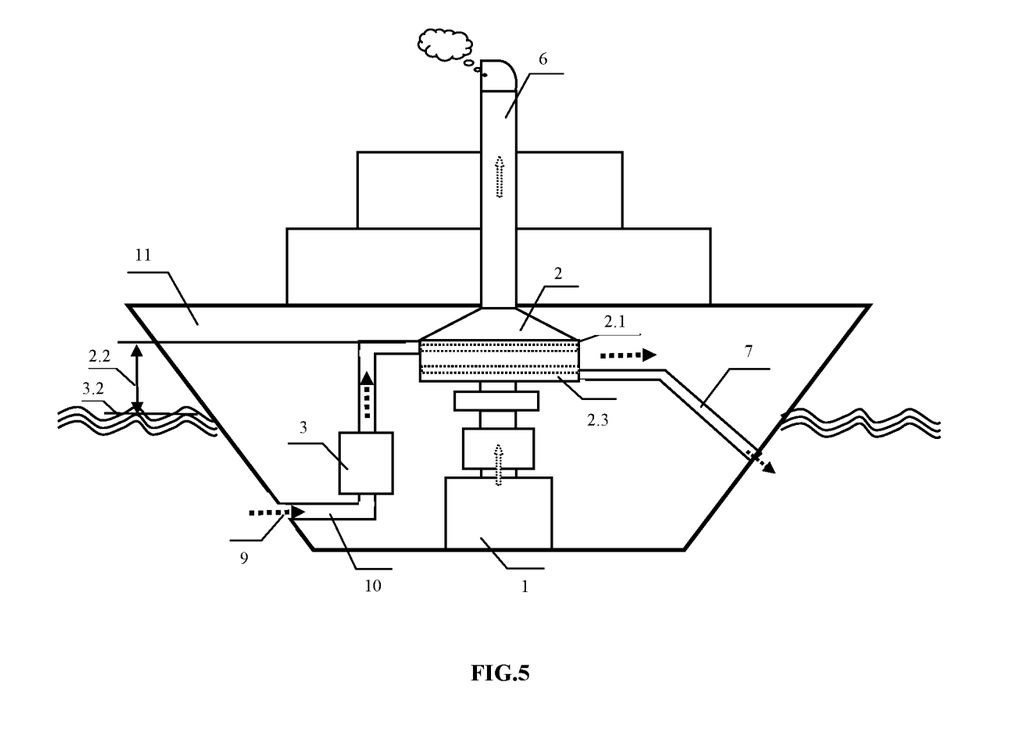
FIG. 5 is a schematic diagram showing an example of a marine ship of the present invention.

This is an example of a marine ship. As shown in FIG. 5, the burner 1 includes a two-stroke ship diesel engine with 130 MW. Heavy oil of sulfur 3.5% v-v is used as the fuel. The volume of generated $CO_2$ is about 8100 $Nm^3/h$. The carbon capture device is configured to substitute the original muffler. The altitude of the water distributor is 6 m based on the load waterline. The volume of scrubbing seawater for carbon capture and storage is about 5800 t/h. Seawater increase pump 3.1 can be adjusted to control the pH value of discharged seawater. In the present example, $CO_2$ emission of the ship flue gas is reduced by 50~70% (specific value is related to the quality and temperature of the seawater where the ship sails), and $SO_2$ emission is reduced by 98%. The effect is equivalent to use of 0.5% S fuel. Therefore, the existing oil with low cost can be still used after 2020 when the limitation to sulfur in global shipping will be performed by the United Nations. The energy consumption of capturing carbon dioxide is not more than 20 MJ/t. The cost for the whole process is equivalent to 0.6% of the fuel consumption of the engine in full power. The discharging of seawater complies with the rules of MEPC in MARPOL annex VI. The after-scrubbing seawater is discharged into the surface layer of the water column in the ocean.

In this example, the detection and control of pH value of seawater in the inlet and outlet is provided, which complies with the rules of MEPC in MARPOL annex VI. The flue gas of engine is scrubbed with seawater in the running ship and no chemical agent is added. The difference of pH value between discharged scrubbing seawater and the seawater in inlet is no more than 2 pH unit. Therefore, the scrubbing seawater can be discharged into the ocean directly, i.e. into the surface layer of water column of the ocean.

In a varied example of building a new ship based on this example, the fuel of the ship is LNG. In this case, the carbon emissions are less than the emission from coal and oil, but it is still a kind of fossil energy needed to reduce and control the carbon emissions.

Example 12

Figure 6:
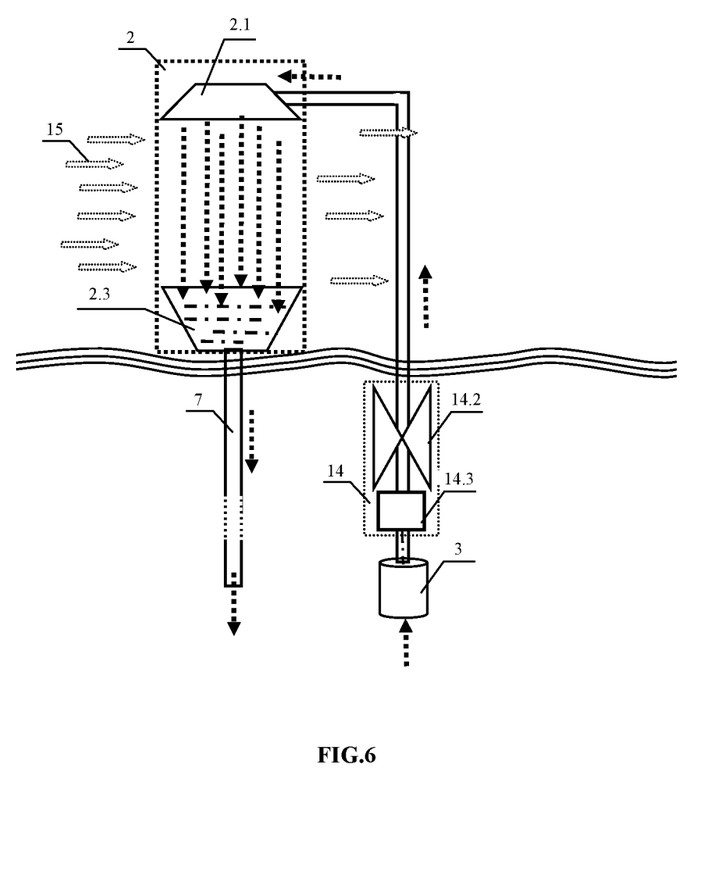
FIG. 6 is a schematic diagram showing an example of water driven carbon capture and storage of atmosphere on ocean of the present invention.

This is an example of apparatus of carbon direct air capture (DAC) and storage on the sea. As shown in FIG. 6, the apparatus comprises:
a carbon capture device 2;
a seawater pumping equipment 3 for leading seawater into the carbon capture device 2;

a power equipment 14 for providing power for the seawater pumping equipment 3;

a water distributor 2.1 which is over the carbon capture device 2;

a water collector 2.3 which is under the carbon capture device 2; and a water discharging pipe 7 which is connected to the water collector 2.3.

The apparatus is fixed on a platform floating on the ocean. The platform is anchored to the seabed.

In a varied example based on this example, the apparatus is fixed on an ocean platform which is connected to the seabed rigidly. In another example based on this example, the apparatus is fixed on an ocean moveable platform.

Example 13

This is an example based on Example 12. As show in FIG. 6, the power equipment 14 comprises:

a water driven device 14.2;

a power transmission device 14.3 which is connected to the seawater pumping equipment 3 to transmit the power provided by the water driven device 14.2 to the seawater pumping equipment 3, wherein the power transmission device 14.3 is a mechanical transmission device.

In a varied example based on this example, the power transmission device 14.3 is an electromechanical transmission device composed of a water driven generator and electromotor.

Example 14

Figure 7:
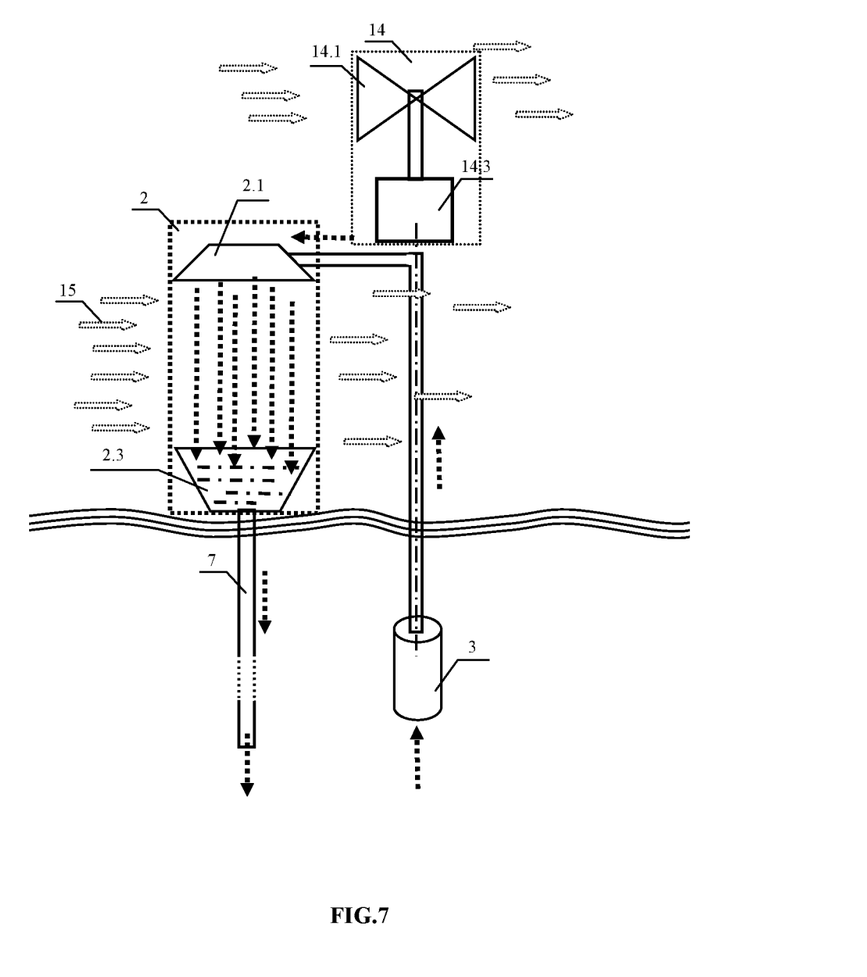
FIG. 7 is a schematic diagram showing an example of wind driven carbon capture and storage of atmosphere on ocean of the present invention.

This is another example based on Example 12. As show in FIG. 7, the power equipment 14 comprises:

a wind driven device 14.1;

a power transmission device 14.3 which is connected to the seawater pumping equipment 3 to transmit the power provided by the wind driven device 14.1 to the seawater pumping equipment 3, wherein the power transmission device 14.3 is a mechanical transmission device.

In this example, a water discharging pipe 7 is connected to the water collector 2.3 under the carbon capture device 2. The outlet of the water discharging pipe 7 is located in the water column of an ocean to discharge the scrubbing seawater containing carbon dioxide into the ocean. Vertical axis rotor is used in the wind driven device. Alternatively, horizontal axis rotor can also be used. The wind driven device transforms the captured wind energy into the rotating mechanical energy to drive the seawater pumping equipment to pump seawater directly. The effect of scrubbing the captured carbon dioxide will be better if the seawater in deeper layer of ocean is pumped. If the water lever in the water collector under the carbon capture device drives the scrubbing seawater into the deeper layer of ocean, the effect of carbon storage will be better. The power transmission device 14.3 has a function of mechanical speed regulation. The carbon capture device 2 is designed to be open vertically to be helpful for capturing the wind. The packings composed of grid plates and grids are provided to improve the efficiency of scrubbing.

In a varied example based on this example, hollow spray tower is used as the carbon capture device. In another varied example based on this example, conventional washing tower is used as the carbon capture device. In another varied example based on this example, the scrubbing seawater is not collected by the water collector but sprayed on the surface of ocean directly.

In another varied example based on this example, a blower is used to blow air in the carbon capture device. The power of blower comes from the wind driven device too.

The apparatuses in the above example are kind of carbon reduction windmill apparatuses. The manufacturing and maintaining cost of the apparatus is far lower than the one of wind driven generator with the same rotor diameter. The effect of reducing the atmospheric carbon content of the apparatus is many times the one of the latter because multistage energy conversion is not required.

Example 15

This is another example based on Example 12. The power equipment 14 comprises:

a wind driven device 14.1;

a power transmission device 14.3;

wherein the power transmission device 14.3 is an electromechanical transmission device composed of a water driven generator and electromotor. Offshore wind driven generator is used as the power equipment 14 directly.

In a varied example based on this example, solar power equipments are used as the power equipment 14 directly.

The protection scope of the claim of the present invention is not limited to the above examples.

The invention claimed is:

1. A process of ocean carbon capture and storage, comprising steps of:
   1) carbon capture including pumping seawater, leading the seawater into a carbon capture device and scrubbing a gas containing carbon dioxide with pumped seawater to produce after-scrubbing seawater as a product of carbon capture in which the carbon dioxide of the gas is absorbed, and
   2) carbon storage including discharging the product of carbon capture into a water column of ocean to realize ocean storage,
   wherein in step 2), the product of carbon capture is discharged into the water column of ocean under atmospheric pressure through a pipe.

2. The process of claim 1, wherein the process further comprises adjusting a ratio of volume of the seawater to volume of carbon dioxide in the product of carbon capture to adjust pH value of the product of carbon capture discharged into the ocean.

3. The process of claim 1, wherein the gas containing carbon dioxide in step 1) is atmosphere, and the seawater for scrubbing is pumped with power provided by wind, and/or wave of ocean current, and/or sunlight.

4. The process of claim 1, wherein the gas containing carbon dioxide is flue gas discharged from burning of fossil fuel.

5. The process of claim 4, wherein the process further comprises the steps that at least 10%, or 20%, or 50%, or 70%, or 80%, or 90% of the carbon dioxide in the flue gas is absorbed into the scrubbing seawater and then is discharged into the water column of ocean, and a volume of the scrubbing seawater is configured to be enough to absorb at least 10%, or 20%, or 50%, or 70%, or 80%, or 90% of the carbon dioxide of the flue gas.

6. The process of claim 1, wherein the process further comprises the step that the seawater is pumped to a head of no more than 50 m, or 40 m, or 30 m, or 20 m, or 19 m, or 15 m, or 12 m, or 10 m, or 9 m, or 8 m, or 6 m, or 5 m, or 4 m, or 2 m, or 1 m to scrub the gas containing carbon dioxide, wherein the head of Om is a level of ocean where the scrubbing seawater is pumped.

7. The process of claim 4, wherein the process further comprises providing packings and performing the scrubbing in the packings, and configuring a head of the pumped scrubbing seawater so that an energy consumption of the carbon capture is no more than 1000 MJ/t, or 500 MJ/t, or 400 MJ/t, or 350 MJ/t, or 300 MJ/t, or 250 MJ/t, or 200 MJ/t, or 150 MJ/t, or 100 MJ/t, or 60 MJ/t, or 50 MJ/t, or 40 MJ/t, or 30 MJ/t, or 20 MJ/t, or 10 MJ/t, or 5 MJ/t.

8. The process of claim 1, wherein the process further comprises continuously discharging scrubbed flue gas into atmosphere, wherein in the scrubbed flue gas, the volume of carbon dioxide has reduced.

9. The process of claim 6, wherein the process further comprises pumping seawater to be above a level of ocean.

10. The process of claim 6, wherein a whole process from the carbon capture to the carbon storage is a consecutive reaction.

11. The process of claim 6, wherein the scrubbing is packing scrubbing realized through contact between the scrubbing seawater and the gas.

* * * * *